US006531837B1

(12) United States Patent
Förstl et al.

(10) Patent No.: US 6,531,837 B1
(45) Date of Patent: Mar. 11, 2003

(54) CONTROL CIRCUIT BETWEEN A PORT OF A MICROPROCESSOR AND AN ACTUATOR AND METHOD OF MAINTAINING THE MOMENTARY STATE OF AN ACTUATOR DURING A DIP IN THE SUPPLY VOLTAGE

(75) Inventors: Bernhard Förstl, Ihrlerstein (DE); Heiko Albers, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/408,474

(22) Filed: Sep. 28, 1999

(30) Foreign Application Priority Data

Sep. 28, 1998 (DE) .......................................... 198 44 454

(51) Int. Cl.⁷ ............................................. H02P 3/00
(52) U.S. Cl. ..................... 318/139; 318/3; 307/10.6; 307/10.1; 307/10.3; 180/65.1; 180/65.8
(58) Field of Search ................. 318/139, 3; 180/65.1, 180/65.8, 287; 307/10.1, 10.3, 10.6

(56) References Cited

U.S. PATENT DOCUMENTS

| 4,450,476 A | * | 5/1984 | Tallant, II ..................... 358/74 |
| 4,531,190 A | * | 7/1985 | Drews et al. .......... 364/431.11 |
| 4,577,599 A | * | 3/1986 | Chmielewski .......... 123/179 B |
| 4,638,228 A | * | 1/1987 | Junginger et al. .......... 318/569 |
| 4,754,255 A | * | 6/1988 | Sanders et al. ................ 340/64 |
| 4,862,010 A | * | 8/1989 | Yamamoto ................ 290/38 R |
| 4,888,697 A | * | 12/1989 | Hemminger et al. ... 364/431.11 |
| 4,896,637 A | * | 1/1990 | Yamamoto .............. 123/179 B |
| 5,147,206 A | * | 9/1992 | Golenski ..................... 434/219 |
| 5,252,861 A | * | 10/1993 | Steeby et al. .............. 307/10.6 |
| 5,563,483 A | * | 10/1996 | Kowall et al. .............. 318/283 |
| 5,614,883 A | * | 3/1997 | Dery et al. .................. 340/458 |
| 5,701,062 A | * | 12/1997 | Barrett ......................... 318/51 |
| 5,729,067 A | * | 3/1998 | Janutka ....................... 310/135 |
| 6,148,781 A | * | 11/2000 | Boegner et al. ......... 123/179.3 |
| 6,208,242 B1 | * | 3/2001 | Engelmann et al. ........ 340/438 |

FOREIGN PATENT DOCUMENTS

| DE | 19720191 C1 | * | 4/1998 |
| EP | 0856625 | * | 8/1998 |
| GB | 2342794 | * | 4/2000 |

* cited by examiner

*Primary Examiner*—Robert E. Nappi
*Assistant Examiner*—Rina I. Duda
(74) *Attorney, Agent, or Firm*—Laurence A. Greenberg; Werner H. Stemer; Gregory L. Mayback

(57) ABSTRACT

A control circuit between a control port of a microprocessor and an actuator has a control stage whose terminal connection is connected to an actuator terminal and whose control connection is connected to the control port of the microprocessor. In normal operation, the control port is switched as an input and, depending on the terminal voltage, the control stage outputs a control signal which is amplified in a driver stage. By switching the control port as an output and applying a low level to the control connection, the control stage can be inhibited in special cases, such as when the supply voltage dips below a given threshold.

11 Claims, 1 Drawing Sheet

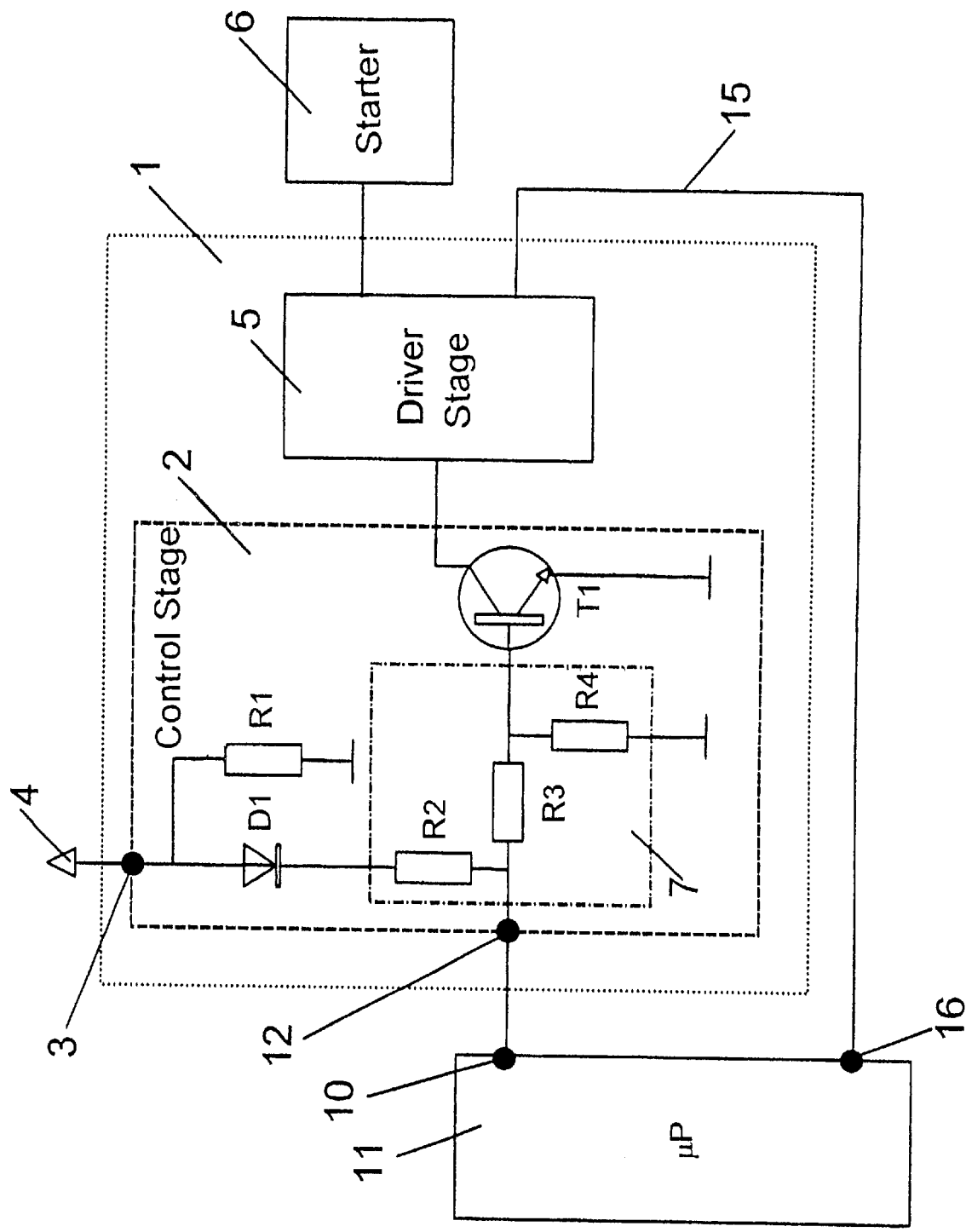

CONTROL CIRCUIT BETWEEN A PORT OF A MICROPROCESSOR AND AN ACTUATOR AND METHOD OF MAINTAINING THE MOMENTARY STATE OF AN ACTUATOR DURING A DIP IN THE SUPPLY VOLTAGE

BACKGROUND OF THE INVENTION

Field of the Invention

The invention relates to a control circuit between a port of a microprocessor and an actuator in a motor vehicle and to a method of maintaining the momentary state of an actuator controlled by a microprocessor during a dip in the supply voltage.

Actuators are increasingly controlled by microprocessors in modern motor vehicles. During the starting procedure of the engine in a motor vehicle, the vehicle supply voltage dips down to +3 volts. With such voltage dips, microprocessor systems are generally put into the reset state. In that case, the connections or ports are switched as high-impedance inputs (tristate condition) and the function currently being executed is terminated. To prevent this, the microprocessor system, including an auxiliary circuit, can be buffered with a capacitor.

German Patent DE 197 20 191 C1 discloses connecting a buffer circuit between the output of a microprocessor and an actuator in a motor vehicle. There, the buffer circuit has a comparison circuit which, when a predetermined voltage level is reached, switches over between a high level and a low level, which is applied to the control device. In addition, the buffer circuit has an energy store in the form of a buffer capacitor. Due to the fact that the energy store is arranged between the output of the microprocessor and the high-impedance input of the comparison circuit enables a function to be maintained with relatively little power. It is thus possible for the energy store used to be a capacitor of SMD design. As a drawback, however, such a buffer circuit is associated with high circuit complexity and consequently higher costs.

SUMMARY OF THE INVENTION

It is accordingly an object of the invention to provide a proper solution for the above-mentioned disadvantages of the heretofore-known devices and methods of this general type and to maintain the operation of an actuator controlled by a microprocessor, using little additional circuit complexity, even when the microprocessor has changed to the reset state as a result of a dip in the supply voltage.

With the foregoing and other objects in view there is provided, in accordance with the invention, a control circuit connected between a control port of a microprocessor and an actuator in a motor vehicle, comprising:

a control stage having
- a terminal connection connected to an actuator terminal associated with an actuator in a motor vehicle and connected to an electrical system in the motor vehicle for a voltage supply to the control stage;
- a control connection connected to a control port of a microprocessor for applying a low level to the control stage from the microprocessor in special cases; and
- an output for outputting a control signal to control the actuator in dependence on a voltage level at the terminal connection and the control connection; and a driver stage connected to the control stage for amplifying the control signal.

The inventive control of an actuator in a motor vehicle is particularly suitable for functions such as the starter, wipers, rear-window heater, seat heater, interior lighting, turn signal lights and the like, which are usually controlled via the port of a microcontroller.

A control circuit is connected between the port of a microcontroller and the actuator to be controlled. The control circuit has a control stage which is electrically connected to that terminal of the electrical system in the motor vehicle that is associated with the actuator to be controlled, e.g. the starter terminal or the turn indicator terminal. The respective terminal is generally referred to herein as the actuator terminal. The output signal from the control stage is amplified in the driver stage, integrated in the control circuit, in accordance with the requirements of the respective actuator and is used to control the actuator. A microprocessor is also electrically connected to the control stage, but performs only overriding checking and diagnostic functions.

Moving the primary control function from the microprocessor to the control circuit in conjunction with the appropriate actuator terminal makes it an easy matter to maintain operation of the actuator irrespective of the supply voltage for the microprocessor.

In accordance with an added feature of the invention, the control stage further comprises a transistor having a transistor input, and a voltage divider connecting the transistor input to the terminal connection and to the control connection.

In accordance with an additional feature of the invention, the voltage divider is designed such that, in normal operation, when a terminal voltage is applied to the actuator terminal, a resultant voltage level at the control connection is recognized as a high level by the microprocessor and the transistor switches on.

In accordance with another feature of the invention, a decoupling diode is connected in a forward direction between the terminal connection and the voltage divider.

In accordance with a further feature of the invention, a bleed resistor connects the terminal connection to ground.

In accordance with again a further feature of the invention, a diagnostic line connects the driver stage to a diagnostic port of the microprocessor.

With the above and other objects in view there is also provided, in accordance with the invention, a method of maintaining a momentary state of an actuator controlled by a microprocessor during a dip in a supply voltage. The method comprises the following steps, to be performed in dependence on a normal state of the system or a special state, e.g., when the supply voltage dips below a given threshold voltage:

- in normal operation, controlling an actuator with a control circuit supplied with voltage via an actuator terminal associated with the actuator; and thereby
- outputting a control signal controlling the actuator with a control stage integrated in the control circuit; and
- amplifying the control signal in a driver stage integrated in the control circuit;
- in special cases, inhibiting the control stage to prevent output of the control signal by outputting a low level at a control port of the microprocessor; and
- in normal operation, processing checking and diagnostic functions with the microprocessor.

In accordance with again an added feature of the invention, in special cases, the control port of the microprocessor is switched as an output and a low level is applied to a control connection of the control stage.

In accordance with again another feature of the invention, in normal operation, the control port of the microprocessor is switched as an input and the voltage level at the control connection of the control stage is read into the microprocessor via the input.

In accordance with a concomitant feature of the invention, the voltage level at the output of the driver stage is read into the microprocessor via a diagnostic line and a diagnostic port; the microprocessor compares the voltage levels read in at the control port and at the diagnostic port; and if the voltage levels do not match, a fault function is recognized, the control port is switched as an output, and the low level is applied to the control connection of the control stage.

Other features which are considered as characteristic for the invention are set forth in the appended claims.

Although the invention is illustrated and described herein as embodied in a control circuit between a port of a microprocessor and an actuator and method of maintaining the momentary state of an actuator during a dip in the supply voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE shows a schematic diagram of a control circuit according to the invention.

DESCRIPTION OF THE PREFERRED EMBODIMENTS

Referring now to the FIGURE of the drawing in detail, there is seen a control circuit 1 with a control stage 2 that is electrically connected to a starter terminal 4 of the motor 2 and via the voltage divider 7. During a legitimate starting procedure—called normal operation as a general term—this control port 10 is switched as a high-impedance input (tristate condition) both in the normal voltage phase and in the reset state, that is to say during a voltage dip. The values of the resistors R2, R3 and R4 in the voltage divider 7 are defined such that the voltage level at the control connection 12 during the starting procedure, that is to say when there is a terminal voltage at the starter terminal 4, is recognized by the microcontroller 11 as a high level and is read into the microcontroller 11 via the control port 10. To prevent voltage being supplied back from the control port 10 of the microcontroller 11 to the starter terminal 4, the control stage 2 contains a decoupling diode D1 connected between the terminal connection 3 and the voltage divider 7 in the forward direction.

In normal operation, control of the starter 6 by the control stage 2 is thus not influenced by the microcontroller 11. In special cases, however, the control port 10 of the microcontroller 11 can be switched as an output so that the transistor T1 is turned off by outputting a low level at the control port 10, irrespective of a terminal voltage at the starter terminal 4. As a result, no control signal is output by the control stage 2. Such special cases, may arise, for example, within the context of the operation of a start inhibitor. In this case, initial states of various units of the vehicle, e.g. brake or clutch, are polled by the microcontroller 11 at the beginning of a starting procedure. If illegitimate initial states come to light during this process—for example, the brake or clutch are not actuated—then control of the starter 6 is blocked for safety reasons by applying a low level to the control connection 12 of the control stage 2.

A diagnostic line 15 connects an output of the driver stage 5 to a diagnostic port 16, connected as an input, of the microcontroller 11. In this way, the voltage level at the output of the driver stage 5 can be read into the microcontroller 11 at the diagnostic port 16. In normal operation, that is to say while the control port 10 is switched as an input, the operability of the control circuit 1 can thus easily be analyzed by comparing the voltage levels read in at the control port 10 and those read in at the diagnostic port 16 of the microcontroller 11. If the two voltage levels do not match, for example if the output of the driver stage 5 is short-circuited to ground, this is recognized as a fault by the microcontroller 11. In this special case, too, the control port 10 is switched as an output and the starting procedure is terminated or inhibited as a precaution by outputting a low level.

The invention affords the advantage that, in normal operation, the starter 6 is not controlled directly by the microcontroller 11, but by the control circuit 1 in conjunction with the starter terminal 4. Hence, the state of the starter 6 is not affected by a dip in the supply voltage and the associated switch to the reset state by the microcontroller 11. The microcontroller 11 continues to carry out overriding checking and diagnostic functions, however, such as monitoring the operability of the control circuit 1 and actively inhibiting the control stage 2 in special cases.

It will be understood that, while the invention was described by way of example for the control of a starter, it is in no way limited to this narrow application. A corresponding control circuit can also be utilized for other actuators that usually controlled by a microprocessor.

We claim:

1. A control circuit connected between a control port of a microprocessor and an actuator in a motor vehicle, comprising:
   a control stage having:
      a terminal connection connected to an actuator terminal associated with an actuator in a motor vehicle and connected to an electrical system in the motor vehicle for a voltage supply to said control stage, the actuator for performing a function other than driving the motor vehicle;
      a control connection connected to a control port of a microprocessor for applying a low level to said control stage from the microprocessor in special cases; and an output for outputting a control signal to control the actuator in dependence on a voltage level at said terminal connection and said control connection; and a driver stage connected to said control stage for amplifying the control signal.

2. The control circuit according to claim 1, wherein said control stage further comprises a transistor having a transistor input, and a voltage divider connecting said transistor input to said terminal connection and to said control connection.

3. The control circuit according to claim 2, wherein said voltage divider is designed such that, in normal operation, when a terminal voltage is applied to the actuator terminal, a resultant voltage level at said control connection is recognized as a high level by the microprocessor and said transistor switches on.

4. The control circuit according to claim 2, which further comprises a decoupling diode connected in a forward direction between said terminal connection and said voltage divider.

5. The control circuit according to claim 1, which comprises a bleed resistor connecting said terminal connection to ground.

6. The control circuit according to claim 1, which further comprises a diagnostic line connecting said driver stage to a diagnostic port of the microprocessor.

7. A method of maintaining a momentary state of an actuator controlled by a microprocessor during a dip in a supply voltage, which comprises:

providing an actuator for performing a function other than driving a motor vehicle;

in normal operation, controlling the actuator with a control circuit supplied with voltage via an actuator terminal associated with the actuator; and thereby outputting a control signal controlling the actuator with a control stage integrated in the control circuit; and amplifying the control signal in a driver stage integrated in the control circuit;

in special cases, inhibiting the control stage to prevent output of the control signal by outputting a low level at a control port of the microprocessor; and in normal operation, processing checking and diagnostic functions with the microprocessor.

8. The method according to claim 7, which comprises, in special cases, switching the control port of the microprocessor as an output and applying a low level to a control connection of the control stage.

9. The method according to claim 7, which comprises, in normal operation, switching the control port of the microprocessor as an input and reading via the input the voltage level at the control connection of the control stage into the microprocessor.

10. The method according to claim 9, which comprises:

reading the voltage level at the output of the driver stage into the microprocessor via a diagnostic line and a diagnostic port;

comparing in the microprocessor the voltage levels read in at the control port and at the diagnostic port; and if the voltage levels do not match, recognizing a fault function, switching the control port as an output and applying the low level to the control connection of the control stage.

11. In combination with a microprocessor and an actuator of a motor vehicle for performing a function other than driving the motor vehicle, a control circuit connected between a control port of the microprocessor and the actuator, the control circuit comprising:

a control stage having
a terminal connection connected to an actuator terminal associated with the actuator and connected to an electrical system of the motor vehicle for a voltage supply to said control stage;

a control connection connected to the control port of the microprocessor for applying a low level to said control stage from the microprocessor in special cases; and an output for outputting a control signal to control the actuator in dependence on a voltage level at said terminal connection and said control connection; and a driver stage connected to said control stage for amplifying the control signal.

* * * * *